(12) United States Patent
Ducra et al.

(10) Patent No.: US 9,341,778 B2
(45) Date of Patent: May 17, 2016

(54) FIBER OPTIC SPLICE PROTECTOR FOR HARSH ENVIRONMENTS

(71) Applicant: WEATHERFORD CANADA PARTNERSHIP, Calgary (CA)

(72) Inventors: Corneliu V. Ducra, Brossard (CA); Remi Charbonneau, Vaudreuil-Dorion (CA); Paul Lefebvre, Ste-Dorothee (CA); Andre Vincelette, Deux-Montagnes (CA)

(73) Assignee: WEATHERFORD CANADA PARTNERSHIP, Calgary, Alberta (CA)

( * ) Notice: Subject to any disclaimer, the term of this patent is extended or adjusted under 35 U.S.C. 154(b) by 0 days.

(21) Appl. No.: 14/075,534

(22) Filed: Nov. 8, 2013

(65) Prior Publication Data
US 2015/0131950 A1    May 14, 2015

(51) Int. Cl.
| | |
|---|---|
| *G02B 6/255* | (2006.01) |
| *G02B 6/44* | (2006.01) |
| *G01L 1/24* | (2006.01) |
| *G01D 5/26* | (2006.01) |
| *G01H 9/00* | (2006.01) |
| *G02B 6/50* | (2006.01) |

(52) U.S. Cl.
CPC ............ *G02B 6/2558* (2013.01); *G02B 6/4427* (2013.01); *G01D 5/268* (2013.01); *G01H 9/004* (2013.01); *G01L 1/242* (2013.01); *G01L 1/247* (2013.01); *G02B 6/4488* (2013.01); *G02B 6/504* (2013.01); *Y10T 29/49947* (2015.01)

(58) Field of Classification Search
CPC ... G02B 6/2558; G02B 6/4427; G02B 6/4488
USPC ........................................................ 385/12, 99
See application file for complete search history.

(56) References Cited

U.S. PATENT DOCUMENTS

| | | | |
|---|---|---|---|
| 4,509,820 A | 4/1985 | Murata et al. | |
| 4,861,133 A | 8/1989 | Blume et al. | |
| 5,157,751 A | 10/1992 | Maas et al. | |
| 5,199,100 A | 3/1993 | Maas et al. | |
| 5,416,873 A | 5/1995 | Huebscher et al. | |
| 5,684,911 A | 11/1997 | Burgett | |
| 5,731,051 A | 3/1998 | Fahey et al. | |
| 5,894,536 A | 4/1999 | Rifkin et al. | |
| 6,338,579 B1 | 1/2002 | Winiarski | |
| 6,404,961 B1 * | 6/2002 | Bonja et al. ................... | 385/109 |
| 6,496,625 B1 * | 12/2002 | Falkowich et al. ............ | 385/100 |
| 6,870,997 B2 | 3/2005 | Cooke et al. | |
| 7,330,621 B2 | 2/2008 | Elkins, II et al. | |
| 7,729,583 B2 | 6/2010 | Elkins, II et al. | |
| 7,949,289 B2 | 5/2011 | Matsuyama et al. | |
| 8,025,445 B2 | 9/2011 | Rambow et al. | |
| 8,238,705 B2 | 8/2012 | Lewallen et al. | |
| 8,408,811 B2 | 4/2013 | De Jong et al. | |
| 2005/0123262 A1 * | 6/2005 | Dowd et al. ................... | 385/135 |
| 2005/0213897 A1 | 9/2005 | Palmer et al. | |
| 2010/0303426 A1 | 12/2010 | Davis | |
| 2011/0135247 A1 | 6/2011 | Achara et al. | |

(Continued)

*Primary Examiner* — Ryan Lepisto (57) ABSTRACT

An optical fiber cable for installation in a subterranean formation, where the temperature could be in excess of 150 degrees C. The optical fiber cable has an outer metallic jacket defining an elongated conduit with an internal elongated channel that receives an optical fiber. The optical fiber has two strands joined by a splice. A splice protector has a body with a passageway receiving the splice. The body has an outer region configured to be joined by a fusion weld to the outer metallic jacket.

28 Claims, 6 Drawing Sheets

(56) References Cited

U.S. PATENT DOCUMENTS

2011/0229071 A1* 9/2011 Vincelette et al. .............. 385/13
2013/0074303 A1 3/2013 Durrant et al.
2014/0219620 A1* 8/2014 Jaaskelainen et al. ........ 385/135

* cited by examiner

FIBER OPTIC SPLICE PROTECTOR FOR HARSH ENVIRONMENTS

FIELD OF THE INVENTION

The invention relates to a device for supporting a spliced optical fiber that is used in harsh environments, such as in wells for the exploration or production of hydrocarbon fuels. The invention also extends to a method for mounting a spliced optical fiber to a splice protector.

BACKGROUND OF THE INVENTION

Oil and gas wells are harsh environments because of the presence of chemically active materials and high temperatures and pressures. Deep wells and development stimulation methods that involve injection of pressurized steam have further raised the operating well temperatures which places even more stress on in-well instrumentation. These harsh conditions create reliability issues for legacy electrical and electronics instrumentation. Optical fiber based instrumentation is more robust and reliable as long as the optical fiber is sealed for both hermeticity and mechanical protection.

One source of failure of an optical fiber is the weaker mechanical connection produced when two strands are joined by fusion splicing. These splices are done by aligning the strand and melting them locally, usually by an arc effect, to fuse them. This method is well known and widely used, but creates a weak mechanical connection that usually has no more than 15% of original fiber axial strength. The fused interphase also leads to a much weaker performance in bending.

U.S. Pat. No. 4,861,133 to Blume et al. and U.S. Pat. No. 5,416,873 to Huebscher et al. illustrate a prior art device for protecting a fused optical fiber joint. In both instances, the protective device is a V shaped clamp receiving the splice that is closed on it such as to prevent it from bending.

Another approach proposed in the U.S. Pat. No. 4,509,820 to Murata et al. is to place the splice in a heat shrunk tube containing a metal rod intended to protect the splice from excessive bends. A drawback of this splice protector is the limited temperature range the splice can tolerate. Heat shrinkable material cannot tolerate very high temperatures which limits the applications of the optical fiber. In addition, the difference of thermal expansion between the metal rod and the optical fiber creates an axial stress on the already mechanically weak joint.

U.S. Pat. No. 5,731,051 to Fahey et al. proposes a sleeve for protecting a fusion splice with a support element made of polymer having a coefficient of thermal expansion which is approximately equal to the coefficient of thermal expansion of the optical fiber. In this fashion, as the fusion splice experiences temperature variations it will expand or shrink at approximately the same rate as the support element, avoiding stresses that would arise otherwise.

U.S. Pat. No. 7,949,289 to Matsuyama et al. proposes a higher temperature material splice protection tube to expand the thermal operating range of the optical fiber, however the range still cannot reach the temperatures encountered in steam stimulated wells which typically vary from 150 degrees C. to 350 degrees C. Similar limitations apply to the splice protector disclosed in the U.S. Pat. No. 5,157,751 to Maas et al.

An optical fiber designed for operations in oil or gas wells must be sealed from chemical contaminants. Typically, this is accomplished by placing the optical fiber in a capillary tube that isolates the optical fiber from the environment. The tube is made from metallic material such as Inconel or stainless steel. Inconel 825 is a specific example of an alloy that can be used for manufacturing the capillary tube. Inconel 825 is considered to be a high performance alloy that offers excellent resistance to heat and corrosion while retaining good mechanical properties such as resistance to stress-corrosion cracking, localized pitting and crevice corrosion.

Challenges arise when a fusion splice covered by a heat shrink splice protector is placed in a capillary protection tube. The splice protector is of larger diameter than the optical fiber and it is heavier, such that it has a tendency to move around in the capillary tube. As such, it is submitted to mechanical vibrations and shocks, thus creating a failure point for the optical fiber.

Therefore, there is a need in the industry to provide a splice protector that is compatible with a capillary tube used in an oil or gas well that alleviates the drawbacks associated with prior art devices.

SUMMARY OF THE INVENTION

As embodied and broadly described herein the invention provides an optical fiber cable for installation in a subterranean formation. The subterranean formation could be of the type where the temperature is in excess of 150 degrees C. The optical fiber cable has an outer metallic jacket defining an elongated conduit with an internal elongated channel that receives an optical fiber. The optical fiber has two strands joined by a splice. A splice protector has a body with a passageway receiving the splice. The body has an outer region configured to be joined by a fusion weld to the outer metallic jacket.

Optionally, the body has a heat shield positioned between the passageway and outer region to prevent heat damage to the optical fiber when the body is fusion welded to the metallic jacket. The heat shield is made of metallic material that has a sufficient heat capacity to buffer the thermal energy generated during the welding process and avoid that the internal area of the splice protector is heated to a point where damage to the optical fiber can occur. In a specific example of implementation, the heat capacity is of at least 0.1 J/g° C. Also, the heat shield has a sufficient thermal diffusivity such as the thermal energy input during the welding process migrates rapidly throughout the heat shield, avoiding hot spots that can melt or otherwise damage the heat shield adjacent the welded area. In a specific example, the heat shield has a thermal diffusivity $\alpha=k/(\rho Cp) >= 30$ mm$^2$/s. The heat shield has a sufficiently high melting point to tolerate without melting the welding temperature. A heat shield made of metallic material, such as copper has been found satisfactory.

In a specific and non limiting example, the outer region of the body is made of a material that is weld compatible with the outer jacket. A material of choice for both the outer jacket and the outer region is Inconel which is highly resistant to corrosion and at the same time it has good mechanical properties. Inconel 825 is an alloy that has been found satisfactory for use in high temperature oil and gas applications. In this example of implementation, the body has an external jacket of Inconel that is of the same cross-sectional dimension than the outer cable jacket, also made of Inconel.

As embodied and broadly described herein, the invention also provides a method for installing a spliced optical fiber in a splice protector. The method includes bringing the splice and the optical fiber to a temperature corresponding to a service temperature of the optical fiber and securing the optical fiber to the splice, while both are at the service temperature.

Typically, the splice protector and the optical fiber have different coefficients of thermal expansion. The above method of installation allows securing the optical fiber to the splice and reducing the magnitude of mechanical stresses acting on the splice when the service temperature is significantly different from room temperature.

The service temperature is a temperature at which the optical fiber is exposed during its operation. In many applications, the service temperature is not a fixed temperature value; rather it resides in a range of temperatures. For example, in the oil and gas industry, an optical fiber inserted in a well, such as a Steam Assisted Gravity Drainage (SAGD) well is subjected to a temperature in the range from about 150 degrees C. to about 350 degrees C. So, in those applications, the service temperature varies between the extremes of that operational range.

Advantageously, the service temperature picked at which the optical fiber and the splice protector are brought during the installation operation is selected such that when the optical fiber and the splice protector are at the highest end of the operational range, the stress acting on the optical fiber is below a level that will damage the optical fiber and particularly the splice.

The computation of the temperature at which the installation is performed can be done as follows. The first step is to determine the maximal allowable stress to which the optical fiber and the splice can be subjected. Once this is determined, the second step is to compute on the basis of the thermal expansion coefficient differential between the optical fiber and the splice protector, the temperature difference at which the maximal stress level will arise. The service temperature picked for the installation is the highest end of the operational temperature range minus the computed temperature difference.

The method for installing a spliced optical fiber in a splice protector can also be performed at room temperature (20 degrees C.) by providing the requisite degree of Excess Fiber Length (EFL) between the attachment points of the optical fiber strands to the splice protector.

As embodied and broadly described herein the invention thus provides an optical fiber cable for installation in a subterranean formation. The optical fiber cable has an outer metallic jacket defining an internal elongated conduit and an optical fiber extending in the internal elongated conduit, the optical fiber having first and second strands joined by a splice. A splice protector having a body with a through bore receives the splice. The body has an outer region joined by a fusion weld to the outer metallic jacket.

As embodied and broadly described herein the invention also provides an optical fiber cable for installation in a subterranean formation. The optical fiber cable has an outer metallic jacket defining an internal elongated conduit, the outer metallic jacket having first and second portions.

An optical fiber extends in the internal elongated conduit, the optical fiber having first and second strands joined by a splice. A splice protector is provided including a body with a through bore receiving the splice, the body having a first attachment point at which the first strand is secured and a second attachment point, spaced apart from the first attachment point at which the second strand is secured, the splice being located between the first and second attachment points, at room temperature an optical fiber segment between the first and second attachment points having a non-nil degree of Excess Fiber Length (EFL).

As embodied and broadly described herein, the invention further provides a splice protector for an optical fiber. The splice protector has an elongated body with a first end portion and a second end portion, the body further having a longitudinal passageway configured for receiving an optical fiber with first and second strands connected to each other by a splice. Each end portion of the body is configured for insertion in a respective cavity of an optical fiber cable section. First and second abutments are associated with the first and second end portions, each abutment configured for engaging the outer metallic jacket of the optical fiber cable section when the optical fiber cable section is mounted to the respective end portion. The body also has an outer region between the first and second abutments, the outer region being substantially flush with the outer metallic jacket of at least one of the optical fiber cable sections.

As embodied and broadly described herein, the invention further provides a splice protector for an optical fiber. The splice protector has an elongated body having a first end portion and a second end portion. The body includes a longitudinal passageway configured for receiving an optical fiber having first and second strands connected to each other by a splice. Each end portion of the body is configured for insertion in a cavity of an optical fiber cable section having an outer metallic jacket. First and second abutments associated with the first and second end portions are provided, each abutment engaging the outer metallic jacket of the optical fiber cable section when the optical fiber cable section is mounted to the respective end portion. An outer region extends between the first and second abutments, the outer region being made of metallic material capable of being fusion welded to the outer metallic jackets of the optical fiber cable sections.

As embodied and broadly described herein the invention further provides a method for installing an optical fiber having first and second sections joined by a splice to a splice protector, wherein the splice protector and the optical fiber are for use at a location where the temperature is in excess of 150 degrees C. The splice protector has an elongated body with a first end portion and a second end portion, the body having a coefficient of thermal expansion that exceeds a coefficient of thermal expansion of the optical fiber. The method including affixing the optical fiber at a first location to the body and to a second location to the body that is remote from the first location, and providing in a segment of the optical fiber including the splice between the first and second locations has an EFL of at least 0.1% at room temperature.

As embodied and broadly described herein the invention yet provides an optical fiber cable for installation in a subterranean formation. The optical fiber cable has a first functional segment, characterized by a first function and a second functional segment characterized by a second function that is different from the first function, one of the first and second functions including measuring at least one physical parameter of the subterranean formation. Each of the first and second functional segments include an outer metallic jacket defining an elongated internal conduit and an optical fiber strand extending in the elongated internal conduit. The optical fiber strand of the first functional segment is connected to the optical fiber strand of the second functional segment by a splice and the splice is placed in a splice protector. The splice protector is affixed to the outer metallic jacket of the first functional segment and to the outer metallic jacket of the second functional segment.

As embodied and broadly described herein, the invention also provides a method for producing an optical fiber cable for use in a subterranean formation for measuring one or more physical parameters of the subterranean formation. The method including providing a plurality of segments for connection to one another to assemble the optical fiber cable, the plurality of segments including a first functional segment and a second functional segment, each functional segment including an elongated outer metallic jacket defining an elongated internal conduit and an optical fiber strand extending in the elongated internal conduit, the first functional segment being characterized by a first function and the second functional segment being characterized by a second function, the first function being different from the first function, one of said first and second functions including measuring at least one physical parameter of the subterranean formation. The method also includes connecting the segments to one another to form the optical fiber cable that includes connecting the optical fiber strand of the first functional segment to the optical fiber strand of the second functional segment by a splice, placing a splice in a splice protector and affixing the splice protector to the outer metallic jacket of the first functional segment and to the outer metallic jacket of the second functional segment.

Yet, as embodied and broadly described herein, the invention provides an optical fiber cable for installation in a subterranean formation. The optical fiber cable has an outer metallic jacket defining an internal elongated conduit and an optical fiber extending in the internal elongated conduit, the optical fiber having first and second strands joined by a splice. A portion of the optical fiber cable including the splice demonstrates no permanent damage when subjected to a bent test during which the portion of the optical fiber cable acquires a radius of curvature that is less than 24 inches.

DETAILED DESCRIPTION

Figure 1:
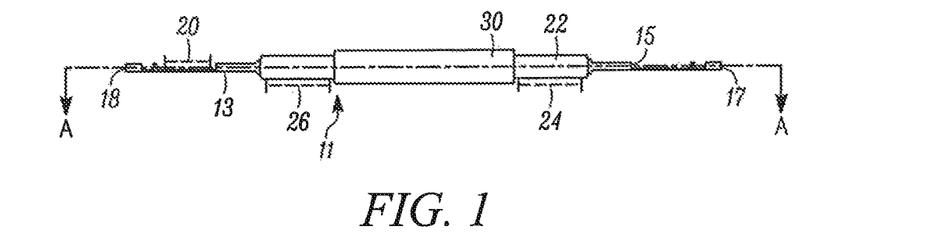
FIG. 1 is a side elevational view of the splice protector according to a non-limiting example of implementation of the invention.

FIG. 1 illustrates an example of a splice protector according to the invention. The splice protector is configured to be integrated to the outer protective jacket of an optical fiber cable to mechanically protect a splice made in the optical fiber of the cable.

Figure 9:
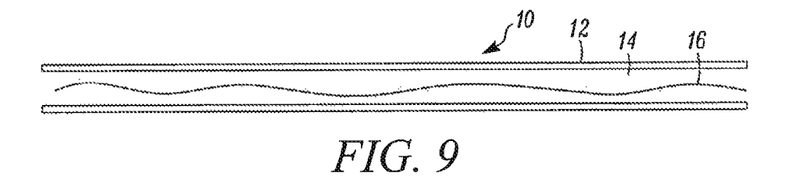
FIG. 9 is a vertical cross-sectional view of an optical fiber cable.

FIG. 9 shows a longitudinal cross-sectional view of the optical fiber cable before the splice is made. The cable 10 has an outer protective jacket 12 that defines an internal cavity 14 for receiving an optical fiber 16. The optical fiber carries optical signals. The signal would typically convey measurement information, such as pressure, and temperature, among others.

The jacket 12 is designed to protect the optical fiber from the environment. When the optical fiber cable 10 is installed in a subterranean formation where high temperatures and pressures are prevalent, such as in an oil or gas well, the jacket 12 is made of metallic material, such as Inconel 825 that provides mechanical and thermal protection.

In a specific example of implementation, the jacket 12 has a circular cross-sectional shape, however other shapes are possible.

Advantageously, the external diameter of the jacket 12 is as small as possible such that the optical fiber cable takes as little space as possible in the oil/gas well passageway. In addition, a small diameter cable is desirable because it allows installing the cable 12 by inserting it through packers that seal the oil/gas well passageway from the exterior. In this fashion, the optical fiber cable 12 can be installed while the oil/gas well is in operation and without special seals. A large diameter cable would make such insertion more difficult, requiring interruption of the operation of the oil/gas well.

In a specific example of implementation, the optical fiber cable 12 has a cross-sectional dimension in the range from about 0.1 inches to about 0.625 inches. Advantageously, the cross-sectional dimension is less than about 0.35 inches, and preferably of 0.25 inches or less. When the jacket 12 is of a circular cross-sectional configuration, the cross-sectional dimension corresponds to its diameter.

The optical fiber cable 10 is spoolable. This means that it is sufficiently small and flexible to be wound on a spool and transported in a wound configuration between the manufacturing facility and the installation site. At the installation site, the optical fiber cable 10 is unwound from the spool as it is inserted into the oil/gas well.

In addition, a spoolable optical fiber cable 10 implies that the cable will not be damaged when wound on the spool for transportation or threaded through a shear during the placement of the optical fiber cable 10 in the subterranean formation. By not damaged is meant that the optical fiber cable 10 will not kink, bend or fold in a way that its structural integrity and functional integrity will be impaired.

The length of the optical fiber cable 10 can vary depending on the installation. The range of lengths can be between several hundredth meters to several kilometers. With such lengths the ability to spool the cable is an important consideration because otherwise transportation of the cable 10 will be difficult.

While custom optical fiber cable lengths can be manufactured for different installations, it is not always possible to determine before hand the exact length that will actually be required. Accordingly, there is an advantage to be able to splice cable sections together to build up the length that the installation needs.

Also, splicing makes it possible to produce long spans of optical fiber cable from shorter prefabricated sections. Instead of custom making each cable, the factory can produce prefabricated sections that are kept in inventory. When a cable of a certain length is to be produced, the required number of prefabricated sections are spliced together. This provides more flexibility as optical fiber cables of varying lengths can be assembled at locations that are remote from the manufacturing site, simply by keeping on hand prefabricated sections and a splicing station.

In addition, splicing allows making an optical fiber cable having different sensor arrangements over selected lengths. The inventory of prefabricated sections can be provided with sections having sensors for different parameters, such as temperature and/or pressure. A custom optical fiber cable is built by splicing sensor array sections with plain sections that have no sensing capability. This approach allows producing optical fiber cables having the desired sensing capability, at the desired location on the cable (the desired position between the cable ends) and over the desired length.

With specific reference to FIG. 1, the splice protector 11 is designed to receive an optical fiber section that has a splice into it. The splice protector 11 engages the protective jacket of the optical fiber cable on both sides of the splice to provide stable support for the splice. The splice protector 11 has an optical fiber carrier 13 designed to receive the optical fiber strands with the splice. The optical fiber carrier 13 has a longitudinal passageway, such as a through bore 15 through which the optical fiber (not shown) can be threaded. The through bore generally extends along the longitudinal axis of the splice protector 11.

The length of the optical fiber carrier 13 can vary depending on the application. For example, the optical fiber carrier 13 can be 5 inches in length for applications in which the diameter of the optical fiber cable is of about 0.25 inches.

At each end of the optical fiber carrier 13 is provided an attachment point 17, 18 at which the optical fiber strands are secured to the optical fiber carrier 13. Different attachment methods are possible. Epoxy based adhesive can be used for comparatively low temperature applications. For service temperatures that are above 150 degrees Celsius, a polyamide based adhesive can be used.

Note that the attachment points 17, 18 include a window 20 that exposes the optical fiber strand and allows the adhesive to be deposited on the optical fiber carrier 13 such as to create a bond surface over a sufficient length for good adhesion.

In a specific example of implementation the optical fiber carrier 13 is made of metallic material.

The optical fiber carrier is surrounded by a cylindrical heat shield 22. The heat shield 22 is a thermal buffer to absorb and dissipate heat generated when the splice protector 11 is fusion welded to the protective jacket of the optical fiber cable. The heat shield is concentric with the optical fiber carrier 13. The ability of the heat shield to buffer thermal energy during the welding operation can be expressed in terms of heat diffusivity. A material that is highly thermally conductive distributes thermal energy rapidly throughout the body of the material, thus avoiding creating a large temperature gradient. This factor is important in the context of fusion welding where a significant amount of heat is locally generated to melt the material of the outer jacket. Copper, silver, gold and alloys of high content of these materials work well. Also it is possible to provide the heat shield with a geometrical design having a high surface/volume ratio, such as radiating fins.

Preferably, the thermal diffusivity of the heat shield should be higher or equal to 30, but generally the higher the value the better. Specific examples of thermal diffusivity values for specific materials are: silver=165, gold=127, copper=111, Al=84, but Al2O3=12 mm$^2$/s, making Al a questionable long term choice since it can convert to aluminum oxide which reduces the thermal diffusivity significantly.

Yet, another characteristic of the heat shield 22 is its high melting temperature to avoid liquefying during the fusion weld.

Instead of using metallic materials, the heat shield 22 can be made from a ceramic-based material which has a high temperature resistance, in other words it can withstand temperatures in the order of magnitude of those generated during the fusion weld without structural degradation. The ceramic material that can be used can be selected to have comparatively high thermal diffusivity or a comparatively low thermal diffusivity. A high thermal diffusivity material will transmit easily heat throughout the body of the heat shield 22, while a low thermal diffusivity material will transmit heat poorly. In the latter case, when the fusion weld is performed, the parts of the heat shield 22 that are adjacent the welding arc will be heated to a temperature that is close to the melting temperature of the outer jacket, however owing to the temperature resistance of the ceramic, the material will not be damaged. Due to the lower thermal diffusivity, the high temperature zone will remain localized and will not propagate throughout the entire body of the heat shield. In this fashion, the optical fiber carrier 13 and the optical fiber mounted to it will be thermally protected.

A heat shield made of ceramic based material that has high thermal diffusivity works similarly to a heat shield made of metal, in the sense that it uses the volume of the entire heat shield to buffer the heat injection during the welding operation.

In terms of dimensions, the heat shield 22 has a transverse dimension that is less than the transverse dimension of the optical fiber cavity, such as to allow the heat shield to fit therein. In this fashion, the heat shield 22 has end portions 24, 26 that fit within the sections of the optical fiber cable that are on either side of the splice protector 11. At the same time the longitudinal extent of the heat shield 22 should be less than the longitudinal extent of the optical fiber carrier 13, to leave the windows 20 exposed to allow the installation of the optical fiber in the optical fiber carrier 13.

Figure 2:
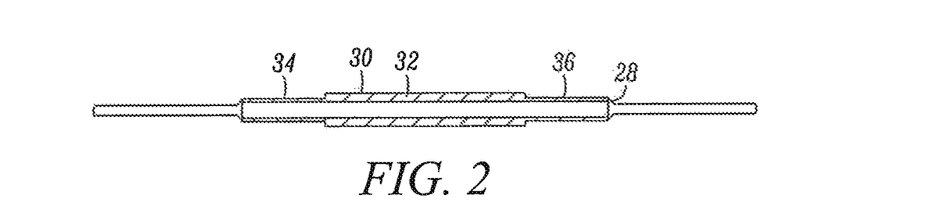
FIG. 2 is a cross-sectional view taken along lines A-A in FIG. 1.
Figure 3:
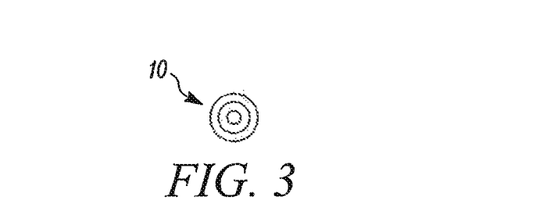
FIG. 3 is transverse cross-sectional of the splice protector shown in FIG. 1.
Figure 4:
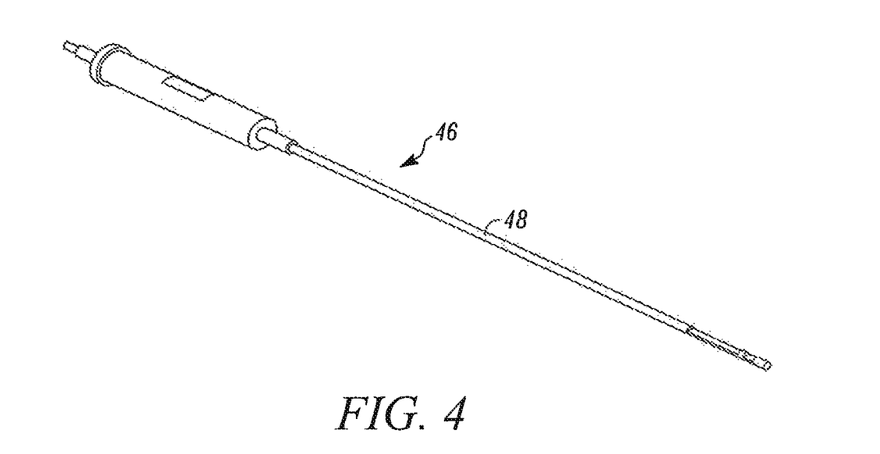
FIG. 4 is a perspective view of the splice protector according to a variant.
Figure 5:
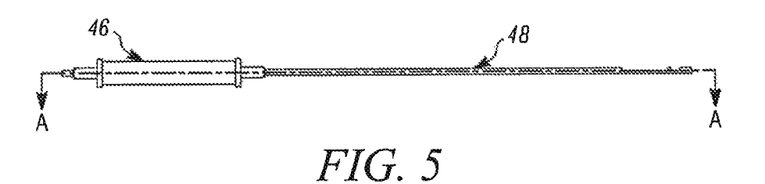
FIG. 5 is a side elevational view the splice protector shown in FIG. 4.

When the optical fiber carrier 13 and the heat shield are made of metallic material, they can be secured to one another during the manufacturing of the splice protector 11 by brazing, as shown at 28 in FIG. 2.

The splice protector also has an outer cover 30 that is concentric with the heat shield 22 and with the optical fiber carrier 13. As better shown in FIG. 2, the outer cover 30 has a central portion 32 and side portions 34, 36. The side portions snugly cover the end portions 24, 26 of the heat shield 22. The difference in thickness between the central portion 32 and the side portions 34, 36 constitute radial shoulders against which abut the outer jackets of the optical fiber cable sections on either side of the splice protector 11.

The outer cover 30 is made of material that is compatible with the material of the outer jacket of the optical fiber cable and that can be fusion welded with it. For instance, the outer cover 30 can be made from the same material as the outer jacket.

The process for installing the splice protector 11 will now be described in connection with FIGS. 8 and 9.

Figure 8:
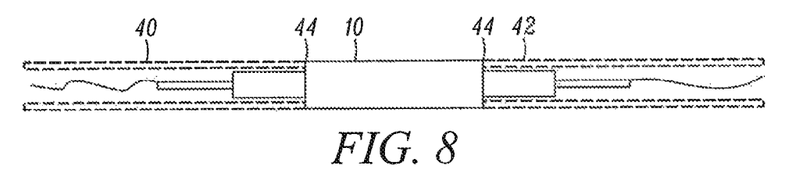
FIG. 8 is a schematical view showing the splice protector according to the invention mounted to the jacket of an optical fiber cable.

FIG. 8 shows two section of optical fiber cable 40, 42 shown in dotted lines on either side of the splice protector 10. This is the position in which the sections 40 and 42 are ready to be fusion welded to the splice protector 10.

The sections 40, 42 may be prefabricated sections to be joined to one another to form a longer length of optical fiber cable. Each section 40, 42 has a free end from which a fiber pigtail projects. The pigtail from one of the sections 40, 42 is inserted through the through bore 15 of the optical fiber carrier 13 until the pigtail exits the opposite side of the through bore 15. The pigtails are then connected to one another by any appropriate method to create a connection allowing signal transmission. At that point, the connection can be tested for structural resistance and functional requirements. If the tests are satisfactory, the optical fiber strand with the splice is pulled back until the optical fiber splice resides somewhere at mid point in the optical fiber carrier 13.

Next, the optical fiber strand that runs through the optical fiber carrier 13 is affixed to the carrier 13. This is performed by heating the splice protector 10 to bring it to its service temperature. The service temperature is the temperature at which the optical fiber is exposed during its operation. In many applications, the service temperature may not be a fixed temperature value; rather it resides in a range of temperatures. For example, in the oil and gas industry, an optical fiber in a well, such as Steam Assisted Gravity Drainage (SAGD) well, is subjected to a temperature that varies in the range from about 150 degrees C. to about 350 degrees C. So, in those applications, the service temperature is any temperature between the extremes of that operational range.

Advantageously, the service temperature picked at which the optical fiber and the splice protector are brought during the installation operation is selected such that when the optical fiber and the splice protector are at the highest end of the operational range, the stress acting on the optical fiber is below a level that will damage the optical fiber and particularly the splice.

The computation of the service temperature picked at which the installation is performed can be done as follows. The first step is to determine the maximal allowable stress to which the optical fiber and the splice can be subjected. Usually, this is a fixed parameter that is well known and depends on the optical fiber used and the method of splicing used. Once this is determined, the second step is to compute on the basis of the thermal expansion coefficient differential between the optical fiber and the splice protector, the temperature difference at which the maximal stress level will be produced. The service temperature picked for the installation is the highest end of the operational temperature range minus the temperature difference.

The splice protector 10 can be heated to the service temperature by using hot air. Once the splice protector 10 and the optical fiber segment with the splice residing in the optical fiber carrier 13 are brought to the desired temperature, the optical fiber strands on either side of the splice are affixed to the attachment points 17, 18 by using adhesive material or a suitable mechanical fastener. In the case of adhesive, the material selected should be able to withstand the service temperature without degrading over time. Polyamide based adhesives are suitable for a service temperature in the range of about 150 degrees Celsius to about 300 degrees Celsius.

If the splice protector 10 is left to cool to room temperature, the splice protector 10 will contract more than the optical fiber due to the difference between the respective expansion coefficients. Accordingly, the optical fiber segment will develop a degree of Excess Fiber Length (EFL) between the attachment points 17, 18. That degree of EFL will dissipate when the optical fiber cable is brought into service as a result of the expansion of the splice protector 10.

Alternatively, the installation of the optical fiber segment into the optical fiber carrier 13 can be done at room temperature without heating the splice protector 10. The optical fiber segment is affixed to the attachment points 17, 18, but with a degree of EFL between them such that when the splice protector 10 is in service, the degree of EFL will compensate for the greater thermal expansion of the splice protector 10.

The degree of EFL can be determined on the basis of the differential between the coefficients of thermal expansion of the splice protector and the optical fiber and the service temperature. The EFL is usually expressed as a percentage of length of the optical fiber. The specific EFL length value can be computed based on the percentage and the distance between the attachment points 17, 18. For example, for a 10% EFL and an inter-attachment point distance of 5 inches, the fiber length that is to be threaded in the bore 15 at room temperature is of 5.5 inches.

In a specific example of implementation, the ELF is of at least 0.1%. Advantageously, the EFL is of at least about 0.15%, more advantageously of at least about 0.2% and preferably of about 0.25%.

Specifically, when the EFL for a certain installation has been determined, two reference marks are made on the optical fiber indicating to the technician the locations on the optical fiber to affix to the attachment points 17, 18. The distance between the reference marks is the distance between the attachment points plus the EFL length. For the installation, the technician places one reference mark in alignment with the first attachment point and affixes it there such that it is firmly attached. Then the technician places the second reference mark in alignment with the other attachment point and affixes it at that location as well. It will be understood that the portion of the optical fiber strand between the attachment points 17, 18 is left free and unattached to the splice protector 10.

Once the optical fiber has been secured to the optical fiber carrier 13, the open ends of the sections 40, 42 are inserted over the end portions 24, 26. The diameter of the side portions 34, 36 matches the internal diameter of the outer jacket such that there is no free play and the sliding fit is snug. In this fashion, the central portion 32 will be flush with the outer jacket. A weld 44 is made at both junctions to create a fusion weld joining the central portion 32 to the outer jacket of sections 40, 42. An orbital welding process can be used for this purpose.

The welding process used can be a two-step process. A first weld is made at one end of the central portion 32 to join the central portion 32 to section 40. The weld just created becomes a heat dissipation path allowing thermal energy in the heat shield 52 to migrate into the outer jacket of section 40. During the second welding step, which connects the central portion 32 to section 42, the thermal absorption capacity of the heat shield 52 is effectively augmented since there is now an additional heat dissipation channel available.

Note that the ability of the heat shield 52 to channel thermal energy into the outer jacket at both ends exists even before the welds are made. As long as there is some degree of physical contact between the side portions 34, 36 and the internal surface of the outer jacket, heat will be channeled away from the heat shield 52. Making the physical connection between the side portions 34, 36 and the internal surface of the outer jacket tighter will improve the thermal transfer ability of the heat shield 52. The need for a tighter fit to improve the thermal transfer needs to be balanced against the ability of the side portions 34, 36 to be inserted within the outer jacket during the assembly without the need of special tools or excessive force.

Once the welding process is completed, the welds can be inspected for sealing integrity and structural integrity. The optical fiber cable can be subjected to pressure testing to ensure that the welds create a hermetic seal. X-ray can be used to ensure proper weld penetration. Suitable mechanical tests such as one subjecting the welds to a twisting stress can be used to verify the structural integrity.

The resulting structure provides a constant cross-sectional dimension without any major variations. Major variations would make it difficult for the optical fiber cable to be inserted in the well.

FIGS. 4 to 7 illustrate a variant. The splice protector 46 has a longer optical fiber carrier 48 to further isolate the optical fiber attachment from the heat generated during the welding operation. In the example shown, the optical fiber carrier 48 is longer on one side. This arrangement is used in instances where one attachment point is more heat sensitive than the other.

Figure 6:
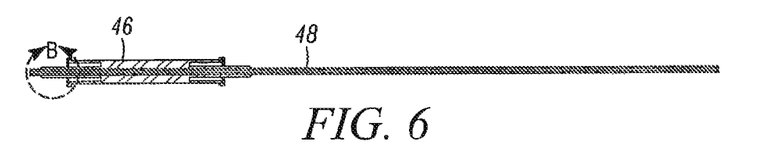
FIG. 6 is a cross-sectional view taken along lines A-A in FIG. 5.
Figure 7:
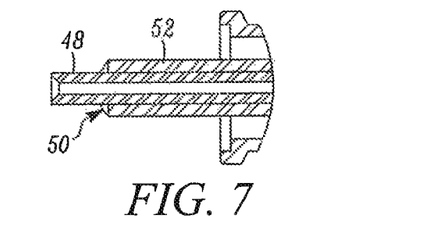
FIG. 7 is an enlarged view of area B shown in FIG. 6.

FIG. 7, which is an enlarged cross-sectional view of detail B shown in FIG. 6. The optical fiber carrier 48 is secured with a brazing joint 50 to the heat shield 52.

In a possible variant, the splice protector can be used to make the junction between optical fiber cable sections that have different diameters. In such case, the central portion of the outer cover 32 is flared, expanding from the smaller diameter section to the larger one.

Figure 10:
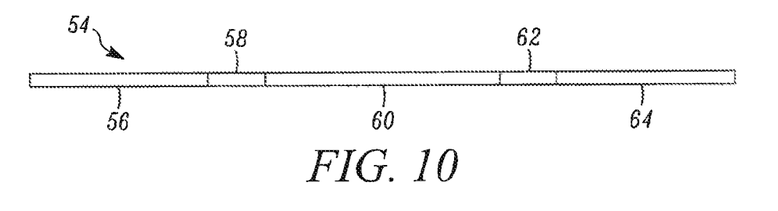
FIG. 10 is schematical view of an optical fiber cable having different functional sections.

FIG. 10 is an example of a modular construction optical fiber cable 54 that uses the splice protector according to the invention. The optical fiber cable 54 is an assembly of different sections that have different functional attributes. The section 56 is a plain cable section which is used for signal transport only. It has an outer jacket housing an optical fiber which conveys optical signals. The plain cable section 56 does not provide any sensing capability. Its function is only to transport the optical signal.

A splice protector 58 joints the optical cable section 56 to another functional section 60. The section 60 has sensing capability and it can measure a physical parameter in the subterranean formation in which the optical fiber cable 54 is installed. For example, the physical parameter that is measured is pressure and/or temperature. An example of an optical fiber cable that can be used for pressure and temperature sensing is described in Canadian Patent Application 2,744, 734. Note that technically, the section 60 has, in addition to the sensing function, a signal transport function as well since the optical signal also travels through section 60.

A splice protector 62 joins the functional section 60 to another functional section 64. The section 64 can provide a sensing function that measures the same or different physical parameter(s) or it can provide a signal transport function as the cable section 56.

It will become apparent that the splice protector can be used to assemble optical fiber cables that have sections of different properties at selected locations of the cable such as to provide sensing capabilities of the type required and at the location required. The cable assembly operation can be carried out in the field or close to the installation site.

If the assembly operation is performed remotely from the installation site, the assembled optical cable can be wound on a spool to facilitate transport. The spooled cable is transported to the installation site and threaded into the well by using traditional capillary lines installation methods, while it is simultaneously being unwound from the spool. In many instances, this approach allows performing the installation without interfering with the well operation and without the need to install any special seals since the optical fiber cable is sufficiently small to pass through existing seals without compromising their sealing function.

Figure 11:
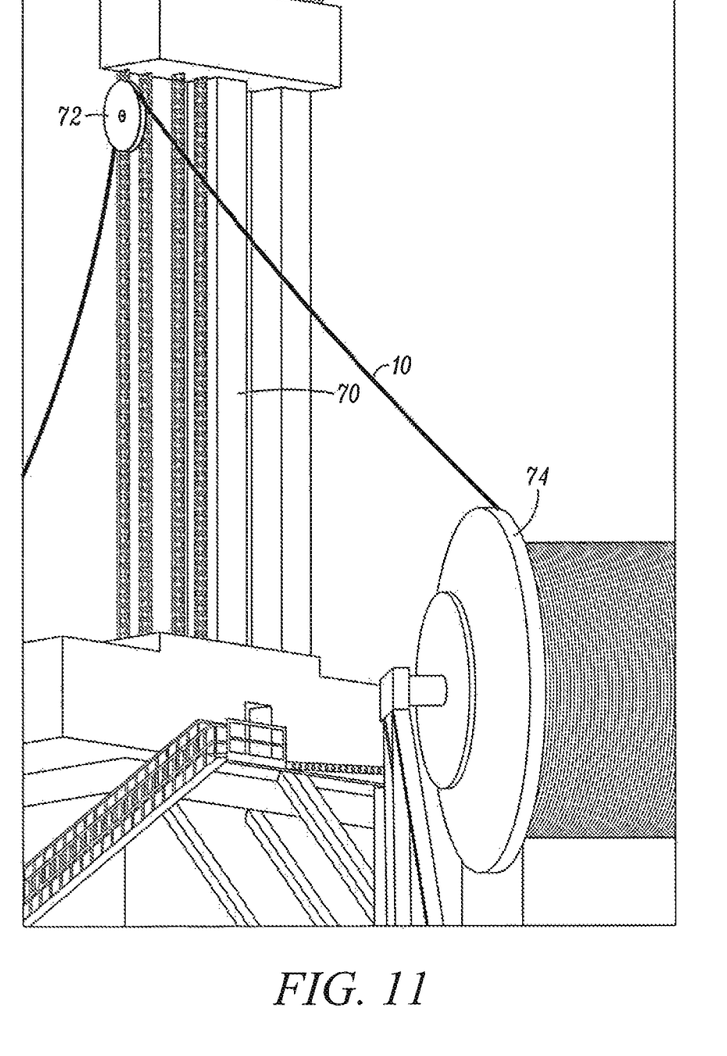
FIG. 11 illustrates the equipment used for installing an optical fiber cable in a well.

FIG. 11 illustrates equipment that is used for installing an optical fiber cable 10 in a well. The equipment includes a rig 70 that supports a sheave 72 on which the optical fiber cable 10 is held. The optical fiber cable 10 arrives at the installation site wound on a spool 74. The optical fiber cable 10 is threaded from the spool 74 through the sheave 72 that is located at a higher elevation than the spool 74. The outgoing run of the optical fiber 10 that leaves the sheave 72 is inserted in the well. The optical fiber cable 10 is unwound from the spool 74 and progressively inserted in the well until it reaches the desired installation depth.

The insertion of the optical fiber cable 10 in the well is thus a continuous process. When the optical fiber cable 10 has been completely assembled at the manufacturing site, there is no need to make any cable splices at the installation site and the optical fiber cable is put in place by unrolling it from the spool 74 and pushing it in the well bore until in reaches the intended installation depth.

The optical fiber 10 has a structure allowing the cable to bend without being damaged. The optical fiber cable 10 is mostly subjected to bends during the manufacturing and installation process and resists those bending stresses without damage that would otherwise undermine its long-term reliability.

The optical fiber cable 10 can also be subjected to bends when it is threaded in a well bore that has elbows, such as wells having a vertical section that turns horizontally at a certain depth. Note that the bends to which the optical fiber cable is subjected when installed in the well, typically are not as severe as those arising during manufacturing or the threading of the optical fiber cable through the installation sheave, because of the large radius of curvature of the elbow.

The bend stresses to which the optical fiber cable is subjected during manufacturing occur when the optical fiber cable 10 is wound on the spool 74. Another bend stress arises during the installation of the optical fiber cable 10 when the cable is unwound. In other words, the optical fiber cable 10, which has taken a set when wound on the spool 74, is bent again, but in the reverse direction to be straightened out.

The most severe bending stress arises when the optical fiber cable 10 passes over the sheave 72 because the sheave 72 has a radius of curvature that is smaller than the radius of the spool 74 and the elbow radius in the well. Again, the bend stress is a dual one. There is a first bend when the optical fiber cable 10 enters the sheave 72 and curves around it, and a second bent when the optical fiber cable 10 exits the sheave 72 and straightens out to enter the well.

Since the installation of the optical fiber cable 10 is a continuous operation, the optical fiber 10 is subjected on its entirety to a bend stress over the sheave 72 during the installation process, as the cable is threaded over that sheave. This means that for the optical fiber cable 10 to remain operational, it should be able to withstand the bend stress without permanent damage. A permanent damage resulting from bent stress is defined in this specification as:

1. A buckled outer metallic jacket in the area of the bend that is subjected to compressive stress. A buckle is a permanent deformation in the outer metallic jacket, which will not go away as the optical fiber cable 10 straightens, such as when it exits the sheave 72. If the buckling is severe enough it could constrict the internal elongated conduit and interfere with the optical fiber. For instance, in extreme cases the buckling can pinch the optical fiber and sever it. Even if the buckling does not sever the optical fiber, it will create an internal deformation in the otherwise smooth walls that will prevent or interfere with the relative movement between the optical fiber and the outer jacket resulting from a different coefficient of thermal expansion. Such relative movement arises when the optical fiber cable 10 is subjected to its service temperature in the well. An interference with the relative motion will create elongation stress in the optical fiber. Such elongation stress, if sufficiently severe could break the optical fiber. Even if the stress is not high enough to break the optical fiber, the added stress in the optical fiber could induce artifacts in the temperature or pressure measurements.

2. Loss of hermeticity in the outer metallic jacket. Loss of hermeticity is defined as the occurrence of leakage pathways in the outer metallic jacket allowing a fluid outside the outer metallic jacket to penetrate the internal cavity. The fluid, which can be a gas or a liquid, would thus enter the internal cavity and attack the fragile optical fiber.

To determine if the optical fiber cable 10 can withstand bending stresses arising during manufacturing, transportation and installation, the optical fiber cable 10 is subjected to a bending stress test. The test procedure is described below in conjunction with FIGS. 13 and 18.

During the test procedure the optical fiber cable 10 is subjected to a bend and then it is straightened out. The outer jacket of the optical fiber cable 10 is visually inspected for buckling. A hermeticity test is performed to check for leakage pathways. If no bucking is visually observed and no leakage detected, the optical fiber cable 10 passes the test.

Figure 13:
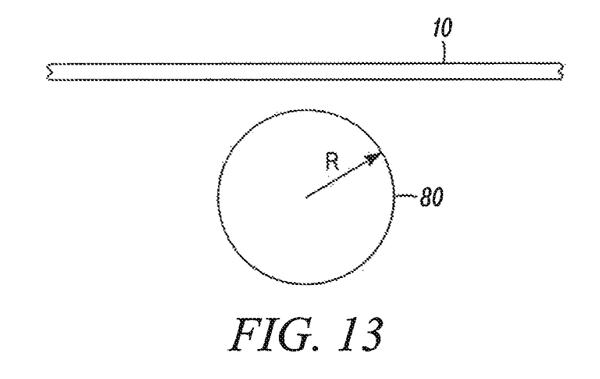
FIGS. 13 to 18 illustrate a set-up for performing a bend test on the optical fiber cable.

As shown in FIG. 13, a section of optical fiber cable 10 to be tested is placed adjacent a circular body 80, which has a radius of curvature R. As shown next in FIG. 14, the section of optical fiber cable 10 is bent around the body 80 such that the two legs 82 and 84 are generally parallel to one another. In this configuration, a bend of 180 degrees has been achieved. Note that due to the springiness in the optical fiber cable 10, it will likely be necessary to bend the optical fiber cable 10 over an angle slightly more than 180 degrees such that upon removal of the bending force acting on the optical fiber cable 10 the legs 82 and 84 remain substantially parallel.

Figure 14:
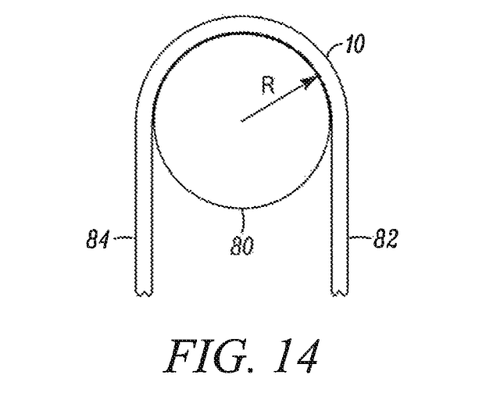

The bending of the optical fiber cable 10 around the body 80 can be made by hand or by automated equipment.

Figure 15:
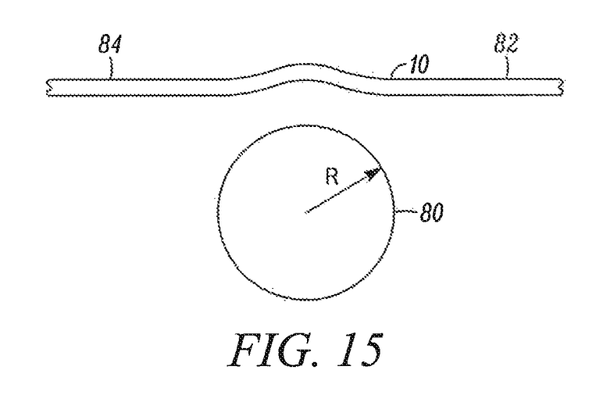

As shown next at FIG. 15, a reverse bend is performed. The legs 82 and 84 are spread apart in an effort to straighten the optical fiber cable 10. The spreading is performed until the legs 82 and 84 are generally collinear when the reverse bending force is removed. Note that a slightly curved section 86 in the optical fiber cable 10 is likely to remain between the legs 82 and 84.

The section of optical fiber cable 10 is now visually inspected to determine if any buckling has occurred. If any buckling is present it will be on the side of the optical fiber cable 10 which faces the round body 80 and which is subjected to compressive stress during the bend. Any buckling will produce locally a marked change in the cross-sectional shape of the optical fiber cable 10. The cross-sectional shape will no longer be circular or oval. Rather it will show an inward deformation in the outer metallic jacket.

If no buckling is observed, the optical fiber cable 10 is subjected to a hermeticity test procedure. The purpose of the hermeticity test procedure is to detect the presence of leakage pathways that may have been created in the outer metallic jacket as a result of the bending stresses. The hermeticity test procedure is performed by subjecting the outer metallic jacket to a pressure differential between the inside and the outside and testing for leaks. Gas, such as air is pumped in the outer metallic jacket and an internal pressure of 1000 pounds per square inch (psi) is established with relation the exterior. The pressurized section of optical fiber cable is tested for leaks. This can be done in a number of ways. A simple procedure is to dip the pressurized cable section in water and visually look for air bubbles. The optical fiber cable section fails the test if any air bubbles are present, indicating the existence of fissures in the outer metallic jacket.

As a practical matter, the presence of the optical fiber in the outer metallic jacket does not influence the outcome of the bending stress test and can be removed. In other words, the test can be satisfactorily performed on the outer metallic jacket alone.

Figure 16:
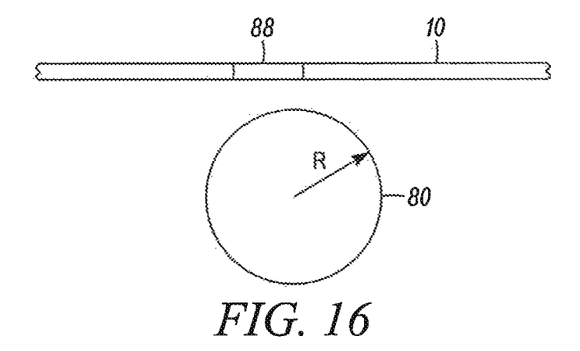
Figure 17:
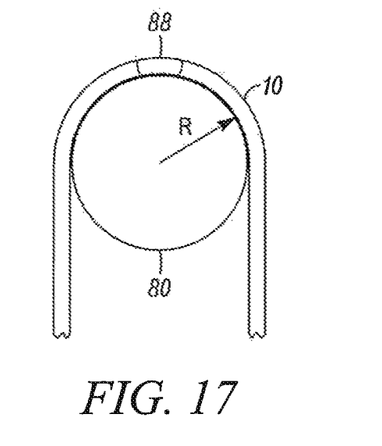
Figure 18:
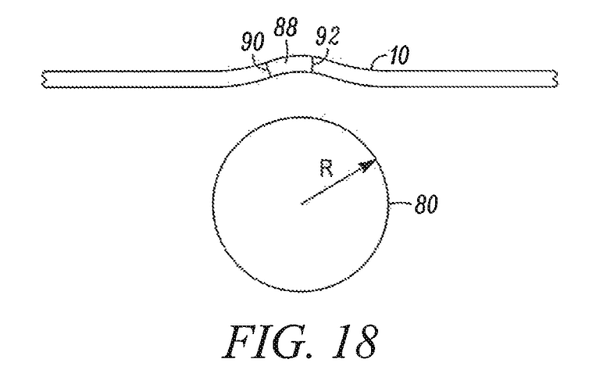

The same procedure is followed when testing a section including a splice protector. The procedure is illustrated in FIGS. 16 to 18. As shown in FIG. 16, a section of optical fiber cable 10 is placed adjacent the round body 80, such that the splice protector 88 would be in the center of the bend. As shown in FIG. 17, the optical cable 10 is bent at 180 degrees and then straightened out, as FIG. 18 indicates. The optical fiber cable 10 is then inspected visually for buckling and pressure tested for hermeticity. Usually, the critical part where leakage pathways may develop is at the welds 90 and 92 between the splice protector 88 and the adjoining segments of the outer metallic jacket.

The optical fiber cable 10 has a construction such that it can successfully pass the bending stress test when the round body 80 has a radius R that is less than 24 inches, preferably less than 18 inches, more preferably less than 12 inches and even more preferably of less than 6 inches.

Figure 12:
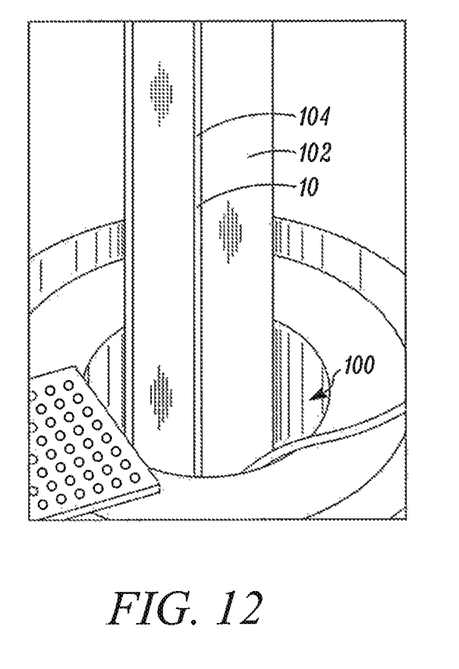
FIG. 12 illustrates an optical fiber cable inserted in a passageway in a swellable packer that is placed in a well.

FIG. 12 illustrates the installation of the optical fiber 10 in the well bore. The well bore is shown at 100. The optical fiber cable 10 is run along most of the well bore length and passes through swellable packers that are installed at spaced apart locations in the well bore to isolate different well bore sections from one another. The swellable packers can be inflated hydraulically or pneumatically to create a fluid-tight seal preventing the passage of fluid between well bore sections on either side of a packer. The reference numeral 102 in FIG. 12 identifies a swellable packer that is in the process of being inserted in the well bore 100. Once in place, the swellable packer 102 can radially expand when pumped with fluid to create a fluid tight seal.

Since the cross-sectional dimension of the optical fiber cable 10 is small, it can be placed in a slit 104 that extends lengthwise from one end of the swellable packer 102 to the other. This approach allows to place the optic fiber cable 10 within the swellable packer 102 and avoids that the optical fiber cable 10 is pinched between the outer periphery of the swellable packer 102 and the well bore. It the latter scenario, the optical fiber cable 10 may prevent the swellable packer to create an adequate seal.

The invention claimed is:

1. An optical fiber cable for installation in a subterranean formation, the optical fiber cable comprising:
   a) an outer metallic jacket having first and second sections, each section defining a respective internal elongated conduit;
   b) an optical fiber having first and second strands connected by a splice, each strand extending into the internal elongated conduit of the respective one of the first and second sections;
   c) a splice protector including a body, the body having:
      i) a longitudinal passageway receiving the splice,
      ii) a first attachment point at which the first strand is secured to the body and a second attachment point, spaced apart from the first attachment point at which the second strand is secured to the body, the splice being located between the first and second attachment points, and
      iii) a third attachment point at which the body is secured to the first section and a fourth attachment point, spaced apart from the third attachment point at which the body is secured to the second section, the third and fourth attachment points being located between the first and second attachment points.

2. An optical fiber cable as defined in claim 1, wherein the temperature in the subterranean formation is in excess of 150 degrees C., said body including an outer surface and said optical fiber cable further including a heat shield between the passageway and the outer surface of the splice protector.

3. An optical fiber cable as defined in claim 2, wherein the heat shield is made primarily from a material selected from the group consisting of metal, ceramic and a combination of metal and ceramic.

4. An optical fiber cable as defined in claim 2, wherein the heat shield is made of copper.

5. An optical fiber cable as defined in claim 2, wherein the outer surface has a maximal cross sectional dimension that does not substantially exceed a maximal cross sectional dimension of at least one of the first and second end portions.

6. An optical fiber cable as defined in claim 2, wherein the first and second portions have, in an area adjacent the splice protector, a maximal cross-sectional dimension that approximately matches the maximal cross-sectional dimension of the outer surface.

7. An optical fiber cable as defined in claim 1, wherein, at room temperature, an optical fiber segment between the first and second attachment points has a non-nil degree of Excess Fiber Length (EFL).

8. An optical fiber cable as defined in claim 7, wherein the non-nil degree of EFL is of at least 0.1%.

9. An optical fiber cable as defined in claim 7, wherein the non-nil degree of EFL is of at least about 0.15%.

10. An optical fiber cable as defined in claim 7, wherein the non-nil degree of EFL is of at least about 0.2%.

11. An optical fiber cable as defined in claim 1, including at least one sensor for measuring a physical parameter.

12. An optical fiber cable as defined in claim 11, including a plurality of sensors for measuring pressure at respective locations along the optical fiber cable.

13. An optical fiber cable as defined in claim 1, wherein the optical fiber cable has a generally uniform diameter along its length.

14. An optical fiber cable as defined in claim 1, wherein the optical fiber cable is spoolable.

15. An optical fiber cable for installation in a subterranean formation, the optical fiber cable comprising:
 a) a first functional segment, characterized by a first function;
 b) a second functional segment characterized by a second function that is different from the first function, one of said first and second functions including measuring at least one physical parameter of the subterranean formation;
  each of the first and second functional segments including:
   i. an outer metallic jacket defining an internal elongated conduit; and
   ii. an optical fiber strand extending in the elongated internal conduit, the optical fiber strand of the first functional segment being connected to the optical fiber strand of the second functional segment by a splice;
 c) a splice protector including a body, the body having a longitudinal passageway receiving the splice, the body having a first end region portion joined by a first fusion weld to the outer metallic jacket of the first functional segment and a second end region portion joined by a second fusion weld to the outer metallic jacket of the second functional segment; and
 d) a portion of the optical fiber cable including the splice protector demonstrates no permanent damage when subjected to a bent test during which the portion of the optical fiber cable acquires a radius of curvature that is less than 24 inches.

16. An optical fiber cable as defined in claim 15, wherein the temperature in the subterranean formation is in excess of 150 degrees C., said body including an outer surface and said optical fiber cable further including a heat shield between the passageway and the outer surface of the splice protector.

17. An optical fiber cable as defined in claim 16, wherein the heat shield is made primarily from a material selected from the group consisting of metal, ceramic and a combination of metal and ceramic.

18. An optical fiber cable as defined in claim 16, wherein the heat shield is made of copper.

19. An optical fiber cable as defined in claim 16, wherein the outer surface has a maximal cross sectional dimension that does not substantially exceed a maximal cross sectional dimension of at least one of the first and second end portions.

20. An optical fiber cable as defined in claim 16, wherein the first and second portions have, in an area adjacent the splice protector, a maximal cross-sectional dimension that approximately matches the maximal cross-sectional dimension of the outer surface.

21. An optical fiber cable as defined in claim 15, wherein the body further includes a first attachment point at which the first strand is secured to and a second attachment point, spaced apart from the first attachment point at which the second strand is secured to, the splice being located between the first and second attachment points, wherein, at room temperature, an optical fiber segment between the first and second attachment points has a non-nil degree of Excess Fiber Length (EFL).

22. An optical fiber cable as defined in claim 21, wherein the non-nil degree of EFL is of at least 0.1%.

23. An optical fiber cable as defined in claim 21, wherein the non-nil degree of EFL is of at least about 0.15%.

24. An optical fiber cable as defined in claim 21, wherein the non-nil degree of EFL is of at least about 0.2%.

25. An optical fiber cable as defined in claim 15, including at least one sensor for measuring a physical parameter.

26. An optical fiber cable as defined in claim 25, including a plurality of sensors for measuring pressure at respective locations along the optical fiber cable.

27. An optical fiber cable as defined in claim 15, wherein the optical fiber cable has a generally uniform diameter along its length.

28. An optical fiber cable as defined in claim 15, wherein the optical fiber cable is spoolable.

* * * * *